(12) United States Patent
Wang et al.

(10) Patent No.: US 8,154,878 B2
(45) Date of Patent: Apr. 10, 2012

(54) CHIP CARD HOLDER

(75) Inventors: Xiao-Zhou Wang, Shenzhen (CN); Zhen-Gang Ding, Shenzhen (CN); Bin Zhao, Shenzhen (CN); Lei Wang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 392 days.

(21) Appl. No.: 12/510,782

(22) Filed: Jul. 28, 2009

(65) Prior Publication Data

US 2010/0053915 A1 Mar. 4, 2010

(30) Foreign Application Priority Data

Aug. 29, 2008 (CN) .......................... 2008 1 0304306

(51) Int. Cl.
*H05K 5/00* (2006.01)
(52) U.S. Cl. ..................................................... 361/754
(58) Field of Classification Search .................. 361/801, 361/802, 803, 807, 810, 756, 727, 731; 439/945, 439/946
See application file for complete search history.

(56) References Cited

U.S. PATENT DOCUMENTS

| | | | | |
|---|---|---|---|---|
| 6,102,714 A | * | 8/2000 | Oliphant et al. | 439/131 |
| 6,186,401 B1 | * | 2/2001 | Magana | 235/475 |
| 6,203,378 B1 | * | 3/2001 | Shobara et al. | 439/638 |
| 6,226,189 B1 | * | 5/2001 | Haffenden et al. | 361/814 |
| 6,375,479 B1 | * | 4/2002 | Johnson et al. | 439/131 |
| 6,601,766 B2 | * | 8/2003 | Nakagawa et al. | 235/451 |
| 6,780,062 B2 | * | 8/2004 | Liu et al. | 439/630 |
| 7,364,439 B2 | * | 4/2008 | Lin | 439/76.1 |
| 7,416,423 B2 | * | 8/2008 | Chi et al. | 439/131 |
| 2004/0229511 A1 | * | 11/2004 | Chen | 439/638 |
| 2006/0057892 A1 | * | 3/2006 | Bricaud et al. | 439/630 |

* cited by examiner

*Primary Examiner* — Lisa Lea Edmonds
*Assistant Examiner* — Xanthia C Cunningham
(74) *Attorney, Agent, or Firm* — Altis Law Group, Inc.

(57) ABSTRACT

An exemplary chip card holder used in a portable electronic device for holding a chip card is provided. The chip card holder includes a body member, a card receiving space disposed on the body member, an elastic piece and a releasing piece. The elastic piece is disposed at one end of the card receiving space and is configured for elastically resisting against the chip card to provide a pushing force to the chip card. The releasing piece is releasably disposed at the other end of the card receiving space opposite to the elastic piece and being configured to hold and release the chip card. The chip card locking device has simple structure and is easy to operate to lock or unlock the chip card.

19 Claims, 3 Drawing Sheets

CHIP CARD HOLDER

BACKGROUND

1. Technical Field

The exemplary disclosure generally relates to a chip card holder for a portable electronic device.

2. Description of Related Art

With the development of wireless technology, portable electronic devices are becoming widely used and multifunctional. Portable electronic devices such as mobile phones typically have chip cards (e.g., SIM card) for storing usable information. It is necessary to provide chip card holders for holding/securing the chip card within the portable electronic device.

The chip card holder usually defines a receiving space and a holding member. The chip card can be partially received and held in the receiving space by the holding member. Accordingly, the chip card has an exposed portion which is not received in the receiving space. The exposed portion is used for the removal (e.g., to be pulled by users) of the chip card out of the receiving space. However, the exposed portion is usually too small and therefore difficult for a user to grasp in removing the chip card from the holder.

Therefore, there is room for improvement within the art.

BRIEF DESCRIPTION OF THE DRAWINGS

Many aspects of the exemplary chip card holder can be better understood with reference to the following drawings. These drawings are not necessarily drawn to scale, the emphasis instead being placed upon clearly illustrating the principles of the present methods. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
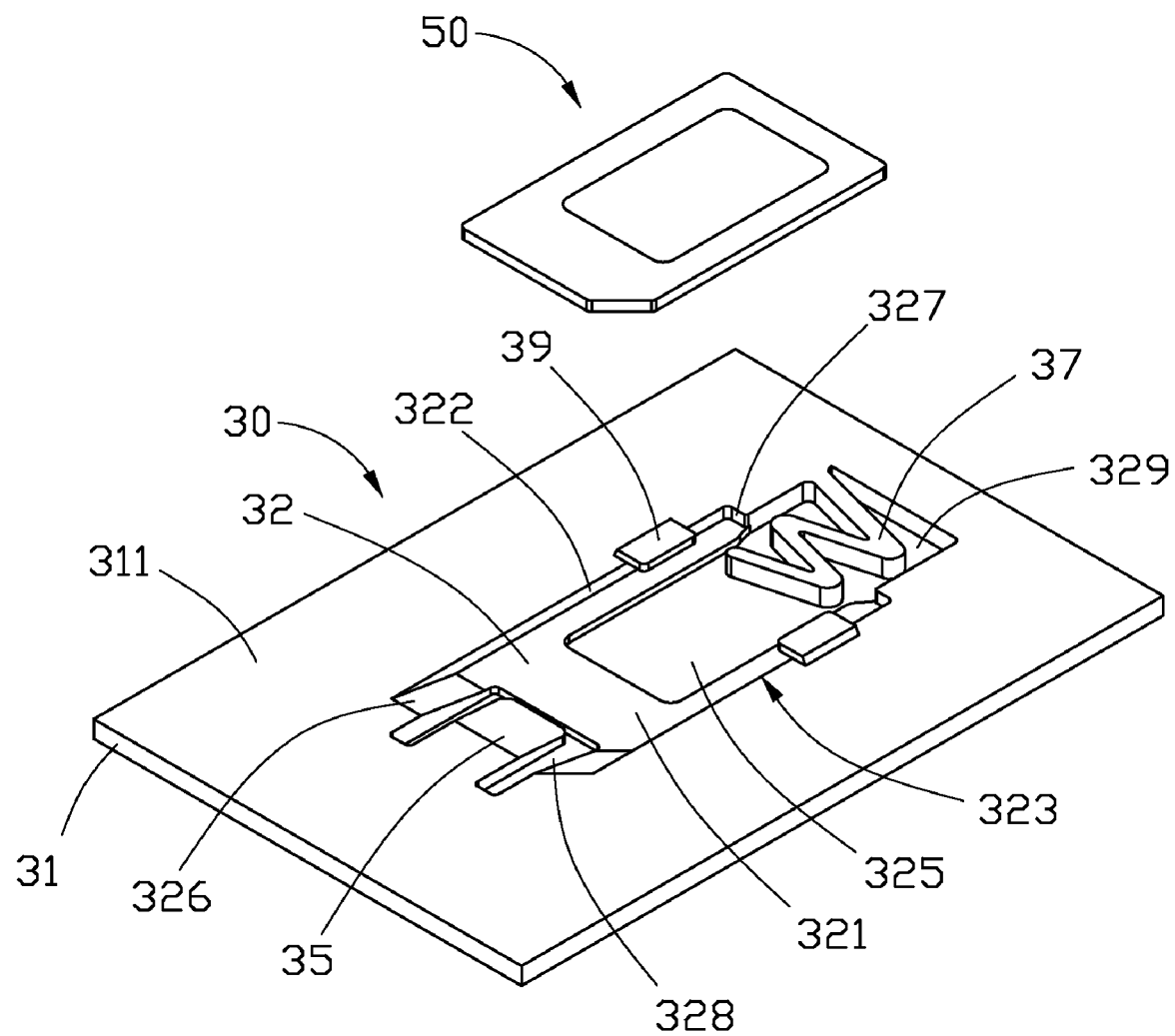
FIG. 1 shows a perspective view of a chip card holder according to an exemplary embodiment, wherein the chip card is detached therefrom.

FIG. 1 shows an exemplary chip card holder 30 used in a portable electronic device (e.g., a mobile phone). The chip card holder 30 is used to hold a chip card 50 therein and includes a body member 31, a releasing piece 35, an elastic piece 37, and at least one latch 39.

The body member 31 may be part of a housing (e.g., a bottom wall thereof) of the portable electronic device. The body member 31 includes a surface 311 and defines a card receiving space 32 recessed in the surface 311 to assemble the chip card 50 therein. The card receiving space 32 includes a bottom wall 321, a first longitudinal sidewall 322, a second longitudinal sidewall 323 opposite to the first longitudinal sidewall 322, a first transverse sidewall 326 and an opposite second transverse sidewall 327. The bottom wall 321 defines a hole 325 therethrough to assemble an elastic card connector (not shown) therein. The first transverse sidewall 326 defines a wedged inclined plane (not labeled) toward the opposite second transverse sidewall 327 and is configured to allow inserting the chip card 50 into the card receiving space 32 or removing the chip card 50 from the card receiving space 32 by sliding it along the wedged inclined plane. The first transverse sidewall 326 defines a substantially U-shaped gap 328 therethrough and there forms the bar-shaped releasing piece 35 facing the opposite second transverse sidewall 327. The releasing piece 35 is located within and surrounded by the U-shaped gap 328.

The releasing piece 35 is made of elastic material and is configured to release the chip card 50. The releasing piece 35 can be swung elastically relative to the body member 31 within the gap 328 by pushing the releasing piece 35 toward the direction perpendicular to the surface 311 of the body member 31. The second transverse sidewall 327 defines a substantially rectangular notch 329 communicating with the hole 325 and the surface 311 of the body member 31 to dispose/assemble the elastic piece 37.

The elastic piece 37 is made of elastic material and is disposed within the notch 329 and partially accommodated within the card receiving space 32 to elastically resist against the chip card 50 when it is assembled within the card receiving space 32 and to provide a pushing force when the releasing piece 35 is released. In the present embodiment, the elastic piece 37 is a substantially wave-shaped compressing spring and formed within the notch 329 by a forming mold process.

The latch 39 is disposed on the surface 311 of the body member 31 adjacent to the card receiving space 32 and is partially positioned above the card receiving space 32 to prevent the chip card 50 from departing from the card receiving space 32. In the present embodiment, there are two spaced apart latches 39 disposed on the surface 311 adjacent to the first longitudinal sidewall 322 and the second longitudinal sidewall 323 respectively opposite to each other and partially positioned above the card receiving space 32. It is to be understood, the latches 39 can be elastic sheets, jaws or other latching structures.

Figure 2:
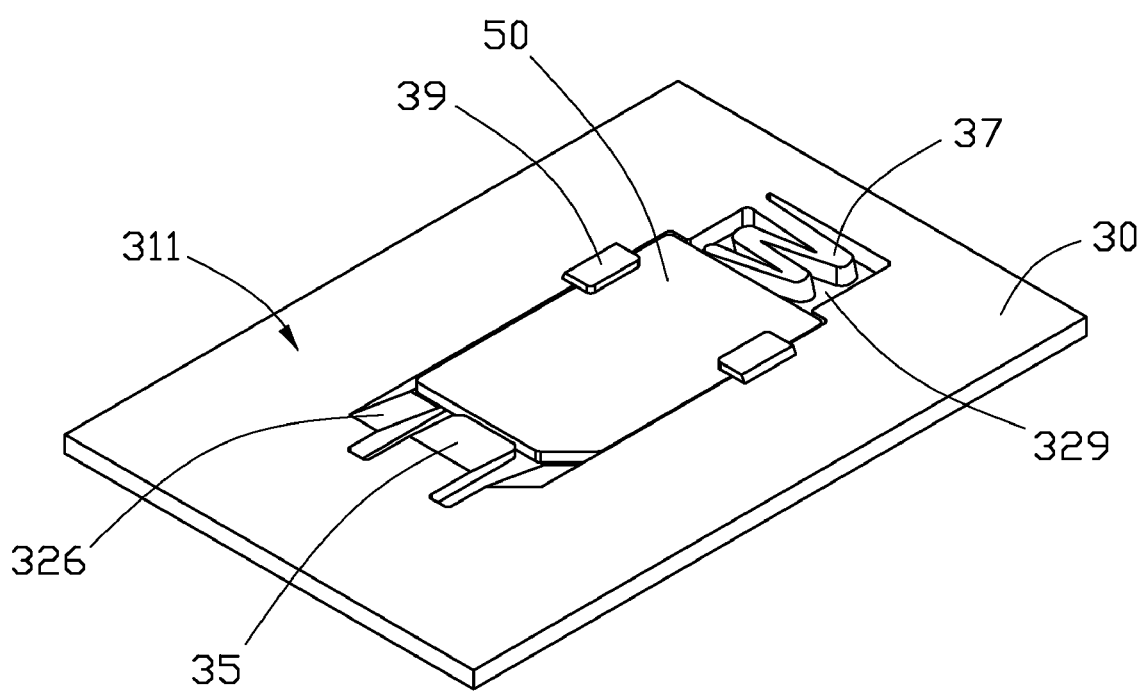
FIG. 2 shows a perspective view of the chip card holder, wherein the chip card is assembled and accommodated within the chip card holder.

Also referring to FIG. 2, when assembling the chip card 50 into the card receiving space 32 of the body member 31 of the chip card holder 30, one end of the chip card 50 slides along the wedged inclined plane of the first transverse sidewall 326 into the card receiving space 32 of the body member 31 and resists against the elastic piece 37. The releasing piece 35 is pressed downwardly until the chip card 50 is totally accommodated within the card receiving space 32. The elastic piece 37 is compressed, and the latches 39 are tightly resisted on the chip card 50. The releasing piece 35 is released to return back to the original position and tightly resist on the opposite end of the chip card 50 to hold the chip card 50. Thus, the chip card 50 is tightly locked and accommodated within the card receiving space 32.

Figure 3:
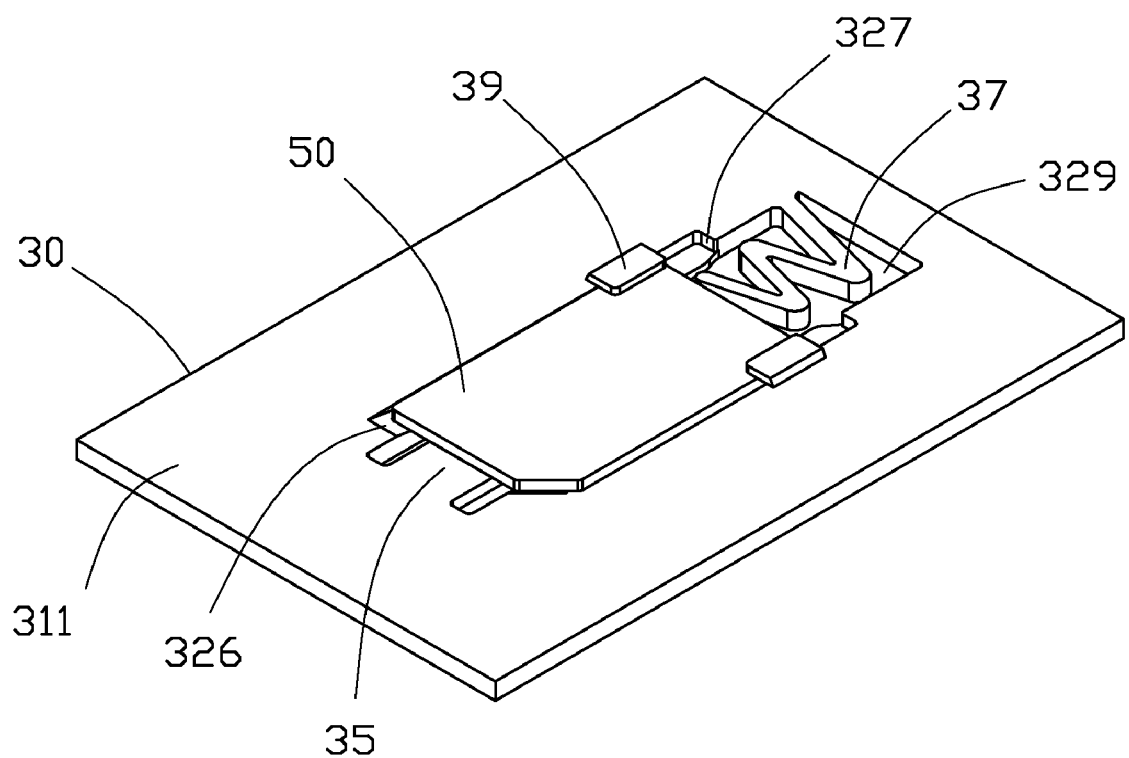
FIG. 3 shows a perspective view of the chip card holder, wherein the chip card is released and partially assembled and accommodated within the receiving space of the chip card holder.

Also referring to FIG. 3, to release the chip card 50 from the card receiving space 32 of the chip card holder 30, the releasing piece 35 is pressed downwardly along the direction perpendicular to the surface 311 of the body member 31 until the distal end of the releasing piece 35 is lower than the chip card 50. Thus, the chip card 50 is pushed out toward the releasing piece 35 by the elastic piece 37 and slides out along the wedged inclined plane of the first transverse sidewall 326. Then, the chip card 50 can be easily removed and the releasing piece 35 is released to return back to the original position.

It is to be understood that the elastic piece 37 could be made of a sponge-like material, a plate spring, a compressing spring, a coil spring and so on.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A chip card holder comprising:
 a body member defining a card receiving space and configured for accommodating a chip card therein;
 an elastic piece disposed at one end of the card receiving space and configured for elastically resisting against the chip card to provide a pushing force to the chip card; and
 a releasing piece releasably disposed at the other end of the card receiving space opposite to the elastic piece, cooperating with the elastic piece to hold the chip card between the releasing piece and the elastic piece, and the releasing piece swings relative to the body member to release the chip card.

2. The chip card holder as claimed in claim 1, wherein the card receiving space includes a first transverse sidewall and an opposite second transverse sidewall, the releasing piece is disposed at the first transverse sidewall, and the first transverse wall defines a wedged inclined plane toward the opposite second transverse sidewall; the elastic piece is disposed adjacent the second transverse sidewall.

3. The chip card holder as claimed in claim 2, wherein the first transverse sidewall defines a gap therethrough, the releasing piece is located within and surrounded by the gap.

4. The chip card holder as claimed in claim 2, wherein the first transverse sidewall defines a gap therethrough, the releasing piece is made of elastic material and is releasably disposed within the gap toward the opposite second transverse sidewall.

5. The chip card holder as claimed in claim 2, wherein the second transverse sidewall defines a notch communicating with the card receiving space, the elastic piece is made of elastic material and disposed within the notch, and partially accommodated within the card receiving space to elastically resist against the chip card.

6. The chip card holder as claimed in claim 5, wherein the card receiving space further includes a first longitudinal sidewall and an opposite second longitudinal side wall; the chip card holder further includes at least one latch disposed on the body member adjacent to the card receiving space and partially positioned above the card receiving space to prevent the chip card departing from the card receiving space.

7. The chip card holder as claimed in claim 5, wherein the elastic piece is a substantially wave-shaped compressing spring and formed within the notch by a forming mold process.

8. The chip card holder as claimed in claim 6, wherein the card receiving space further includes a bottom wall, the bottom wall defines a hole therethrough communicating with the notch to assemble an elastic card connector therein.

9. The chip card holder as claimed in claim 6, wherein the latch is an elastic sheet or a jaw.

10. A chip card holder comprising:
 a body member defining a card receiving space and configured for accommodating a chip card therein;
 at least one latch disposed on the body member adjacent to the card receiving space and partially positioned above the card receiving space to prevent the chip card departing from the card receiving space;
 an elastic piece disposed at one end of the card receiving space and configured for elastically resisting against the chip card to provide a pushing force to the chip card; and
 a releasing piece releasably disposed at the other end of the card receiving space opposite to the elastic piece, cooperating with the elastic piece to hold the chip card between the releasing piece and the elastic piece, and the releasing piece swings relative to the body member to release the chip card.

11. The chip card holder as claimed in claim 10, wherein the card receiving space includes a first transverse sidewall and an opposite second transverse sidewall, the releasing piece is disposed at the first transverse sidewall, and the first transverse wall defines an inclined plane toward the opposite second transverse sidewall.

12. The chip card holder as claimed in claim 11, wherein the first transverse sidewall defines a gap therethrough, the releasing piece is located within and surrounded by the gap.

13. The chip card holder as claimed in claim 11, wherein the first transverse sidewall defines a gap therethrough, the releasing piece is made of elastic material and is releasably disposed within the gap toward the opposite second transverse sidewall.

14. The chip card holder as claimed in claim 12, wherein the second transverse sidewall defines a notch communicating with the card receiving space, the elastic piece is made of elastic material and disposed within the notch, and partially accommodated within the card receiving space to elastically resist against the chip card.

15. The chip card holder as claimed in claim 14, wherein the card receiving space further includes a first longitudinal sidewall and an opposite second longitudinal side wall; the at least one latch disposed on the body member adjacent to the first longitudinal sidewall and the second longitudinal sidewall and partially positioned above the card receiving space to prevent the chip card departing from the card receiving space.

16. The chip card holder as claimed in claim 15, wherein the elastic piece is a substantially wave-shaped compressing spring and formed within the notch by a forming mold process.

17. A chip card holder comprising:
 a body member defining a card receiving space and configured for accommodating a chip card therein;
 an elastic piece disposed adjacent to one end of the card receiving space; and
 a releasing piece releasably disposed at the other end of the card receiving space opposite to the elastic piece;
 wherein the elastic piece and the releasing piece cooperatively configured to resisting against the chip card between the releasing piece and the elastic piece.

18. The chip card holder as claimed in claim 17, wherein the body member defines a gap therethrough and there forms the releasing piece facing the elastic piece.

19. The chip card holder as claimed in claim 18, wherein the elastic piece is a substantially wave-shaped compressing spring and disposed in the card receiving space.

* * * * *